United States Patent
LeCrone et al.

(10) Patent No.: US 11,669,356 B2
(45) Date of Patent: Jun. 6, 2023

(54) SIMULATION FOR ALTERNATIVE COMMUNICATION

(71) Applicant: EMC IP Holding Company LLC, Hopkinton, MA (US)

(72) Inventors: Douglas E. LeCrone, Hopkinton, MA (US); Jeffrey L. Jones, Fort Lauderdale, FL (US); Paul A. Linstead, Shrewsbury, MA (US); Bruce A. Pocock, Hoschton, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 17/160,949

(22) Filed: Jan. 28, 2021

(65) Prior Publication Data
US 2022/0237006 A1    Jul. 28, 2022

(51) Int. Cl.
*G06F 9/455* (2018.01)
*H04L 67/1097* (2022.01)
*H04L 69/16* (2022.01)
*G06F 13/16* (2006.01)
*H04L 69/08* (2022.01)
*H04L 69/321* (2022.01)
*H04L 69/00* (2022.01)

(52) U.S. Cl.
CPC .......... *G06F 9/455* (2013.01); *G06F 13/1668* (2013.01); *H04L 67/1097* (2013.01); *H04L 69/03* (2013.01); *H04L 69/08* (2013.01); *H04L 69/16* (2013.01); *H04L 69/321* (2013.01)

(58) Field of Classification Search
None
See application file for complete search history.

(56) References Cited

U.S. PATENT DOCUMENTS

| 2007/0115846 | A1* | 5/2007 | Kooyers | H04L 43/0847 370/465 |
| 2020/0394110 | A1* | 12/2020 | Ramohalli Gopala Rao | G06F 11/2066 |
| 2021/0232458 | A1* | 7/2021 | LeCrone | G11B 5/00813 |

* cited by examiner

Primary Examiner — Jeffrey R Swearingen
(74) Attorney, Agent, or Firm — Muirhead and Saturnelli, LLC

(57) ABSTRACT

A host computing system includes an applications layer containing one or more user applications that perform I/O operations, an access methods layer that communicates with the applications layer, an I/O drivers layer that communicates with the access methods layer, and an SSCH simulation layer that communicates with the I/O drivers layer and that simulates a Fibre Channel connection that is accessed by applications in the applications layer. The host computing system may also include a TCP/IP stack layer that communicates with the SSCH simulation layer to provide TCP/IP communication for the host computing system. TCP/IP communication provided by the TCP/IP stack layer may be separate from any dedicated TCP/IP communication provided by the host. The host computing system may be coupled to a TCP/IP network. A cloud storage may be coupled to the network to communicate with the host computing system.

19 Claims, 4 Drawing Sheets

SIMULATION FOR ALTERNATIVE COMMUNICATION

TECHNICAL FIELD

This application relates to the field of computer systems and storage system therefor and, more particularly, to the field of storage access and I/O operations among computing systems and storage system.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

Communication between storage systems and host systems may be provided by a Fibre Channel connection using an appropriate communication protocol, such as the ANSI FC-SB-3 Single-Byte Command Code Sets-3 Mapping Protocol for Fibre Channel, commonly known as the FICON® communication protocol. The Fibre Channel connection may be used to transmit both control commands and data being accessed by a host system at the storage system. Information is transmitted serially in frames, each having a frame header indicating whether a particular frame contains data, a control command, status information, etc.

In some cases, it may be desirable to replace the Fibre Channel communication with a different communication mechanism, such as TCP/IP, which provides benefits such as communication over the Internet. Making such a replacement is certainly possible in instances where an operating system driver may be modified by, for example, the originator of the driver or an authorized party. However, in some cases, the driver may be "closed" in that it cannot be modified by a third party. In such cases, it may be possible to intercept Fibre Channel communication and repackage and resend the data using TCP/IP. Although this solution is possible, there are practical considerations that make it challenging. Moreover, devices on both ends of a communication connection need to be adapted the same way for the scheme to work.

Accordingly, it is desirable to provide a mechanism that allows replacing Fibre Channel communication with alternative communication, such as TCP/IP communication, without modifying third party drivers and without undue complexity or coordination.

SUMMARY OF THE INVENTION

According to the system described herein, a host computing system includes an applications layer containing one or more user applications that perform I/O operations, an access methods layer that communicates with the applications layer, an I/O drivers layer that communicates with the access methods layer, and an SSCH simulation layer that communicates with the I/O drivers layer and that simulates a Fibre Channel connection that is accessed by applications in the applications layer. The host computing system may also include a TCP/IP stack layer that communicates with the SSCH simulation layer to provide TCP/IP communication for the host computing system. TCP/IP communication provided by the TCP/IP stack layer may be separate from any dedicated TCP/IP communication provided by the host. The host computing system may be coupled to a TCP/IP network. A DLm tape emulation system and/or a storage system may be coupled to the network to communicate with the host computing system. A cloud storage may be coupled to the network to communicate with the host computing system. The cloud storage may be a private cloud storage. The cloud storage may be a public cloud storage. The cloud storage may be configured to respond to conventional storage system commands provided by the host. The cloud storage may be configured to provide conventional storage system status messages to the host. The cloud storage may be configured to exchange conventional storage system data with the host. The data may be CKD format data.

According further to the system described herein, accessing cloud data includes coupling the cloud storage to a network, coupling a host to a TCP/IP network, the host having an SSCH simulation layer that simulates a Fibre Channel connection that is accessed by applications on the host and having a TCP/IP stack layer that exchanges data, commands, and status information with the SSCH simulation layer to provide TCP/IP communication between the host computing system and the cloud storage, and includes the host providing Fibre Channel communications directed at the cloud storage. The Fibre Channel communications is provided to the TCP/IP network by the SSCH simulation layer and the TCP/IP stack layer. TCP/IP communication provided by the TCP/IP stack layer may be separate from any dedicated TCP/IP communication provided by the host. The cloud storage may be a private cloud storage. The cloud storage may be a public cloud storage. The cloud storage may be configured to respond to conventional storage system commands provided by the host. The cloud storage may be configured to provide conventional storage system status messages to the host. The cloud storage may be configured to exchange conventional storage system data with the host. The data may be CKD format data.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism to allow a host to communicate on an alternative network, such as a TCP/IP network, without needing to modify any third party drivers. An SSCH simulation layer communicates with a convention I/O drivers layer in a way that corresponds to communication by an actual SSCH layer that provides Fibre Channel communications. The SSCH simulation layer uses a TCP/IP stack layer to provide TCP/IP communications.

Figure 1:
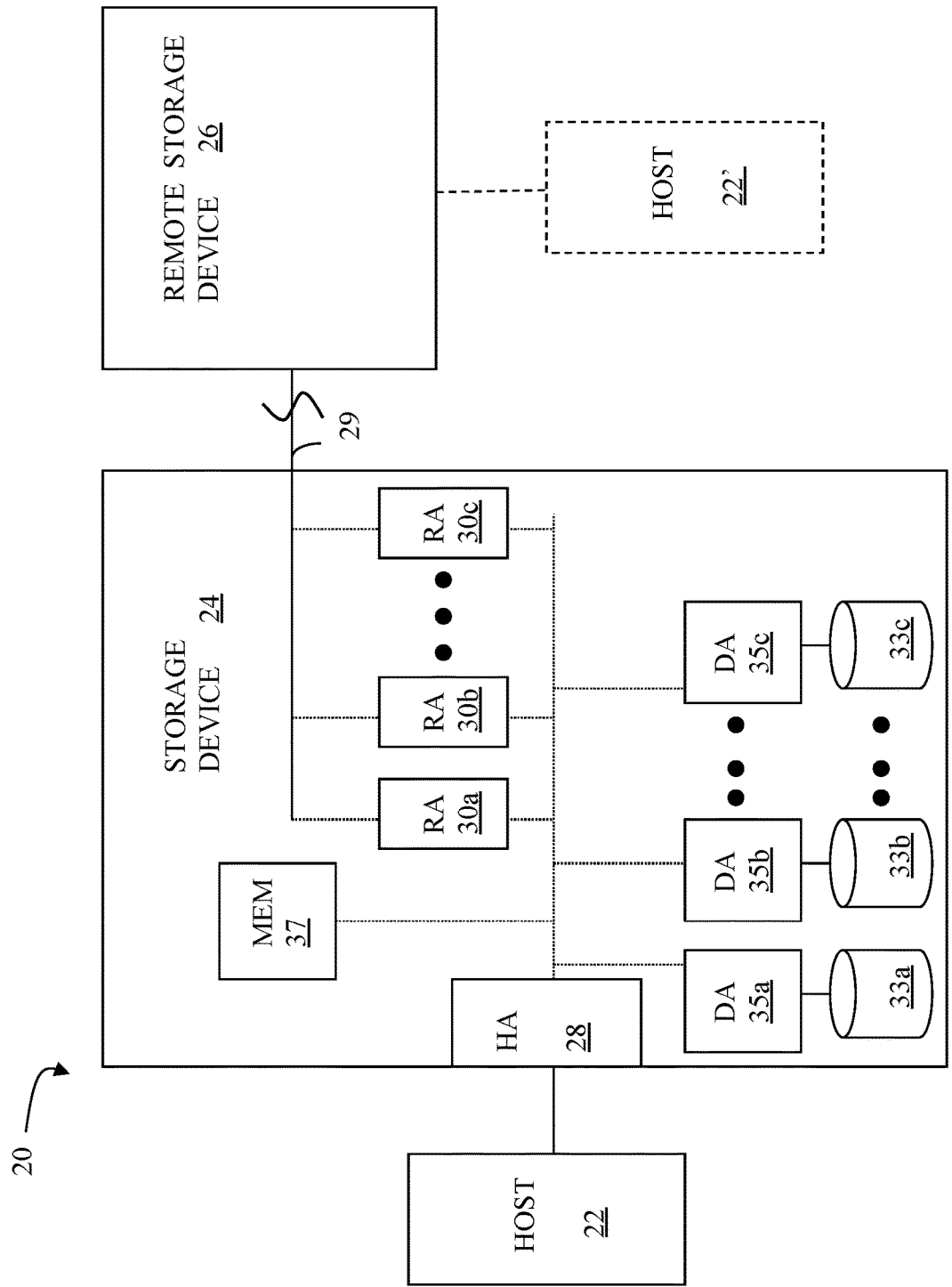
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33a-33c. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/ or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the source storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
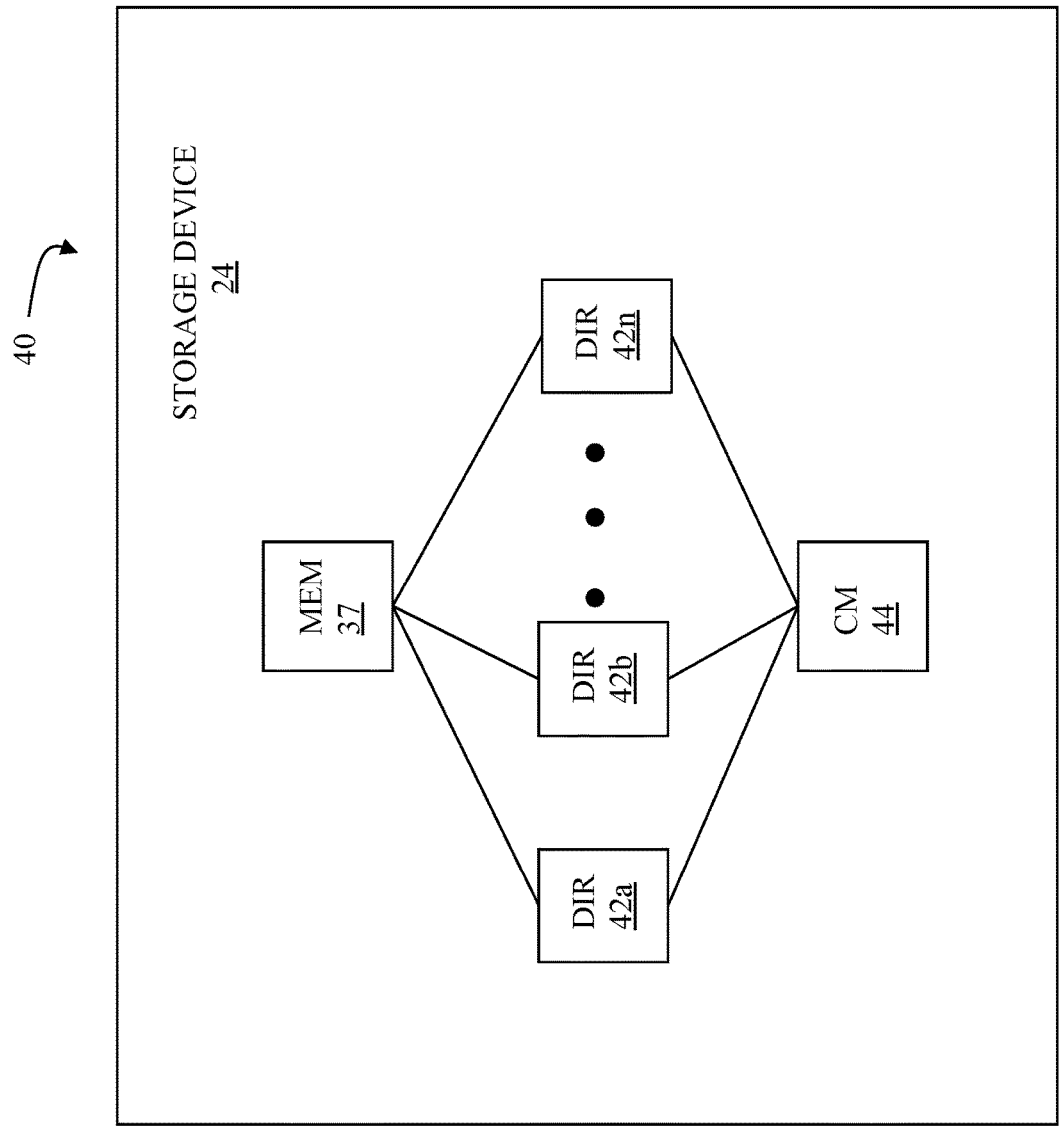
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the source storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
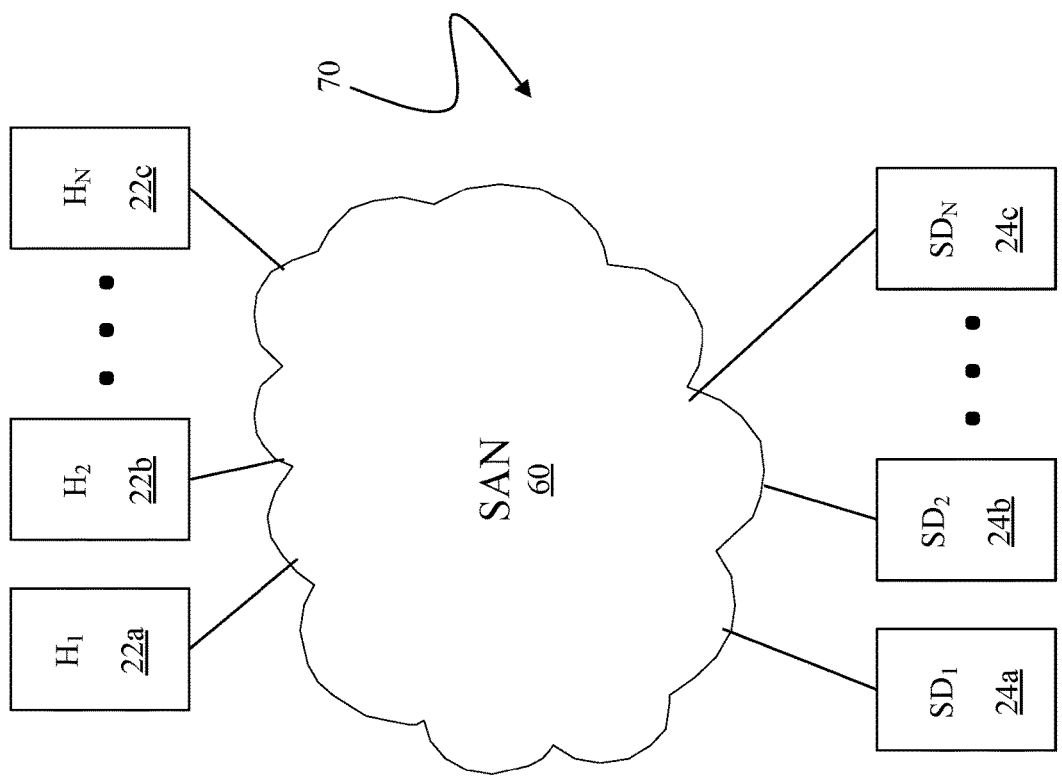
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
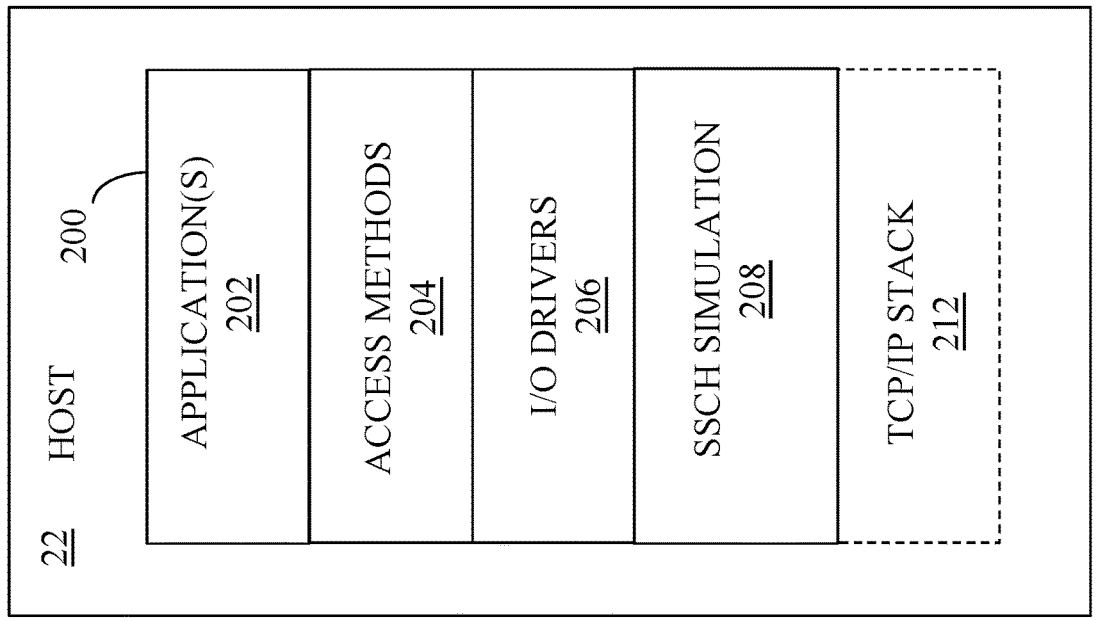
FIG. 4 is a schematic illustration showing software layers in a host according to an embodiment of the system described herein.

Referring to FIG. 4, the host 22 is shown in more detail to include software 200 having an application(s) layer 202, an access methods layer 204, an I/O drivers layer 206, an SSCH simulation layer 208, and a TCP/IP stack layer 212. In an embodiment herein, the host 22 may be an IBM mainframe computer. The application(s) layer 202 includes one or more software applications that run on the host 22. The access methods layer 204 includes high level I/O routines (e.g., read, write, open, etc.) that are used by applications in the application(s) layer 202 in connection with performing I/O operations. Software in the application(s) layer 202 calls specific routines in and communicates with the access methods layer 204 to exchange data with an external device.

The high level I/O routines in the access methods layer 204 call I/O driver routines in the I/O drivers layer 206 that perform lower-level device specific operations that depend upon the specific type of I/O device and the type of connection thereto. For example, a first driver for a Symmetrix storage system coupled to the host 22 by a Fibre Channel connection may be different than a second driver used for a different type of non-volatile storage system coupled to the host 22 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the I/O drivers layer 206, depending upon a specific configuration/hardware of the system.

The SSCH simulation layer 208 includes routines that simulate a conventional SSCH layer that performs low-level operations that make calls to a channel subsystem layer for I/O operations that use a channel subsystem. The SSCH simulation layer 208 simulates a Fibre Channel connection that is accessed by applications in the applications layer 202 as if the applications were accessing an actual Fibre Channel connection. From the perspective of the I/O drivers layer 206, as well as the applications layer 202 and the access methods layer 204, the SSCH simulation layer 208 contains all of the same interfaces and entry points as an SSCH layer that provides actual Fibre channel communication. Thus, an application could make a read or write call to read or write Fibre Channel data that would be accepted and serviced by the SSCH simulation layer 208.

A conventional SSCH layer directly controls the hardware used for subchannel I/O operations, including any storage systems and subchannels used from transferring data between the host 22 and the storage systems using, for example, a Fibre Channel connection. In a similar way, the SSCH simulation layer 208 communicates with and exchanges data with a TCP/IP stack layer 212 that facilitates TCP/IP communication for the host 22. Note that any TCP/IP communication provided by the TCP/IP stack layer 212 may be separate from any dedicated TCP/IP communications that is otherwise provided by the host 22, such as TCP/IP communications provided by a conventional OSA adaptor. Note also that other communication protocols may be used instead of TCP/IP so that the TCP/IP stack layer 212 may be replaced with a layer that provides a different communication protocol, including possibly a proprietary communication protocol, and that interacts with the SSCH simulation layer 208. All of the layers 202, 204, 206, 208, 212 may exchange commands and/or status information with adjacent ones of the layers 202, 204, 206, 208, 212.

For the system described herein, applications in the applications layer 202 do not need to be modified and may make the same calls to the access methods layer 204 (e.g., read, write, etc.) which make the same calls and perform the same operations with respect to the driver layer 206. Thus, applications on the host 22 may exchange data with other systems independently from any particular connection protocol. Generally, the system described herein provides an alternative communication mechanism for systems, such as the host 22, that are otherwise configured to communicate using Fibre Channel protocols, such as the ANSI FC-SB-3 Single-Byte Command Code Sets-3 Mapping Protocol for Fibre Channel, commonly known as the FICON® communication protocol.

The system described herein may be adapted to any of a number of uses. For example, a host, such as an IBM System Z mainframe or a DLm tape emulation system provided by Dell EMC of Hopkinton Mass. may communicate using TCP/IP even though being otherwise configured to use a Fibre Channel protocols. Note also that a host emulation or simulation system may also be configured to communicate with a storage system, a tape emulation system and/or a storage system emulation. The alternative communication may be bi-directional so, for example, a first system communicates with a second system using TCP/IP and the second system communicates with the first system using TCP/IP where the first and second systems are otherwise configured to communicate using a Fibre Channel protocol.

Figure 5:
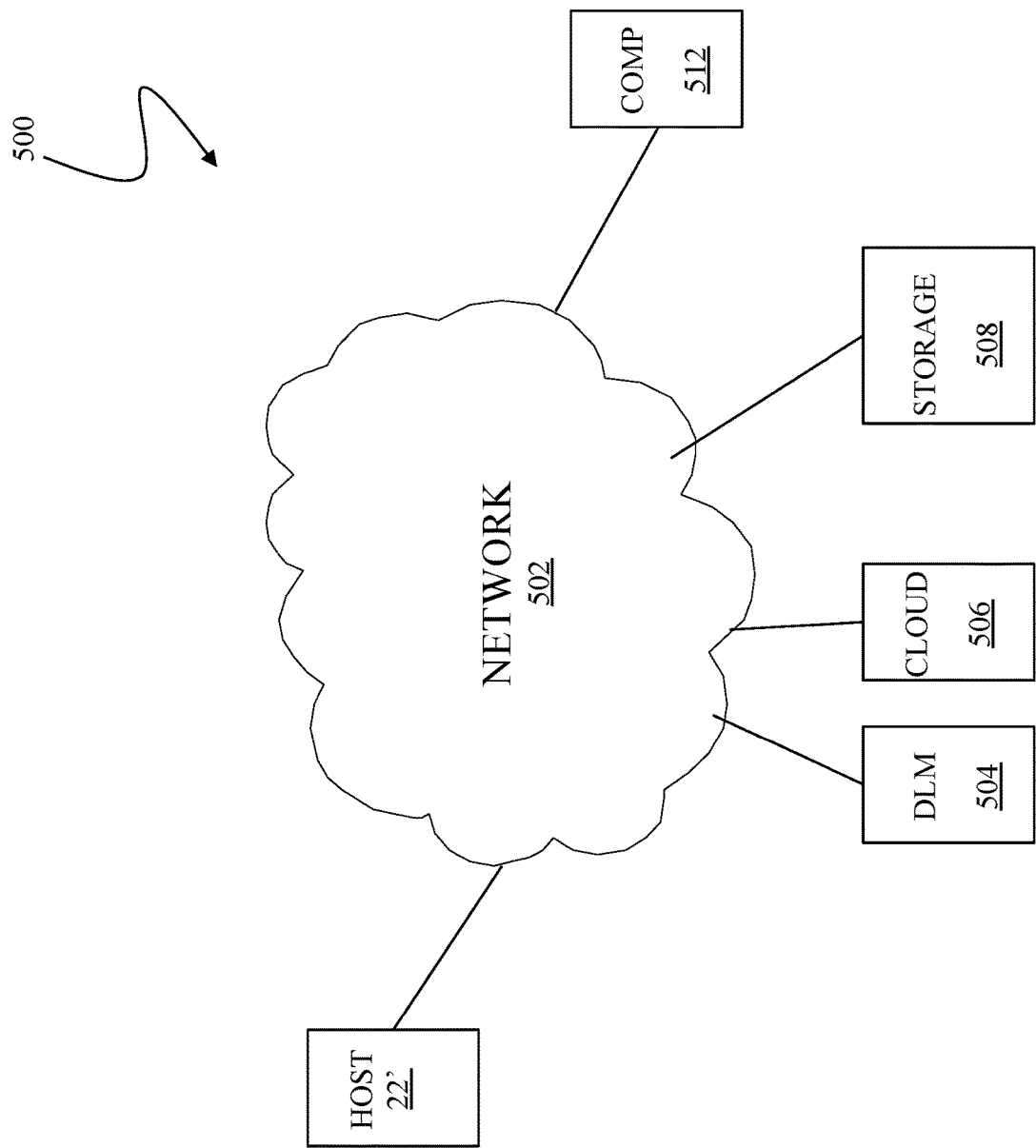
FIG. 5 is a schematic illustration showing a host, a network, and network components according to an embodiment of the system described herein.

Referring to FIG. 5, a diagram 500 shows a host 22' communicating with a network 502, which may be the Internet or some other type of network, such as a private TCP/IP network. The host 22' is like the host 22 and may include an SSCH simulation layer that communicates with a driver layer and a TCP/IP stack to provide TCP/IP communication in lieu of Fibre Channel communication. The network 502 may also communicate with a DLm tape emulation system 504, a cloud storage 506, a storage system 508 having TCP/IP communication capability, or generally any appropriate network component 512. The host 22' may communicate and exchange data with one or more of the DLm tape emulation system 504, the cloud storage 506, the storage system 508, or the network component 512, which may appear to an application on the host 22' as being connected using a Fibre Channel.

The cloud storage 506 may be a private cloud storage provided by an organization for its own internal use, a semi-private cloud storage provided by a collection of organizations for use by members, or a public cloud storage such as Amazon Web Service (AWS) or Microsoft Azure. The cloud storage 506 provides security controls so that only authorized users may access data and possibly so that it is possible for some of the users to only be able to read data. In an embodiment herein, the cloud storage 506 may be accessible from any location via the World Wide Web, although it may be possible to impose restrictions on access, such as geographic restrictions (e.g., prohibiting access from Internet addresses originating in certain countries). In other embodiments, the cloud storage 506 may be part of a private network that is not generally accessible, but may nonetheless be geographically diverse.

In an embodiment herein, one or more applications on the host 22' access the cloud storage 506 in a manner similar to accessing a storage system coupled to the host 22' via a Fibre Channel connection. That is, the cloud storage 506 appears to the host 22' as a storage system connected via a Fibre Channel. The host 22' reads and writes data to the cloud storage 506 using conventional storage system commands and formats. The cloud storage may be configured to respond to conventional storage system commands provided by the host 22', to provide conventional storage system status messages to the host 22', and to exchange conventional storage system data with the host 22', including CKD format data.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A host computing system, comprising:
   a processor; and
   a non-transitory computer readable medium containing software that, when executed by the processor, accesses a cloud storage over a TCP/IP network, the host computing system and the cloud storage both being coupled to the TCP/IP network and the software including:
      an applications layer containing one or more user applications that perform I/O operations;
      an access methods layer that communicates with the applications layer;
      an I/O drivers layer that communicates with the access methods layer;
      an SSCH simulation layer that communicates with the I/O drivers layer and that simulates a Fibre Channel connection that is accessed by applications in the applications layer; and
      a TCP/IP stack layer that exchanges data with the SSCH simulation layer to provide TCP/IP communication for the cloud storage from the host computing system to the TCP/IP network.

2. A host computing system, according to claim 1, wherein TCP/IP communication provided by the TCP/IP stack layer is separate from any dedicated TCP/IP communication provided by the host.

3. A host computing system, according to claim 2, wherein at least one of a DLm tape emulation system or a storage system is coupled to the network to communicate with the host computing system.

4. A host computing system, according to claim 1, wherein the cloud storage is a private cloud storage.

5. A host computing system, according to claim 1, wherein the cloud storage is a public cloud storage.

6. A host computing system, according to claim 1, wherein the cloud storage is configured to respond to conventional storage system commands provided by the host.

7. A host computing system, according to claim 1, wherein the cloud storage is configured to provide conventional storage system status messages to the host.

8. A host computing system, according to claim 1, wherein the cloud storage is configured to exchange conventional storage system data with the host.

9. A host computing system, according to claim 8, wherein the data is CKD format data.

10. A host computing system, according to claim 1, wherein the TCP/IP network is the Internet.

11. A method of accessing cloud data, comprising:
coupling the cloud storage to a TCP/IP network;
coupling a host computing system to the TCP/IP network to provide TCP/IP connectivity between the host computing system and the cloud storage, the host computing system having an SSCH simulation layer that simulates a Fibre Channel connection that is accessed by applications on the host computing system and having a TCP/IP stack layer that exchanges data, commands, and status information with the SSCH simulation layer to provide TCP/IP communication for the cloud storage from the host computing system to the TCP/IP network; and
the host computing system providing Fibre Channel communications from the applications on the host computing system and directed at the cloud storage, the Fibre Channel communications being provided as TCP/IP communication from the host computing system to the TCP/IP network by the SSCH simulation layer and the TCP/IP stack layer.

12. A method, according to claim 11, wherein TCP/IP communication provided by the TCP/IP stack layer is separate from any dedicated TCP/IP communication provided by the host.

13. A method, according to claim 11, wherein the cloud storage is a private cloud storage.

14. A method, according to claim 11, wherein the cloud storage is a public cloud storage.

15. A method, according to claim 11, wherein the cloud storage is configured to respond to conventional storage system commands provided by the host.

16. A method, according to claim 11, wherein the cloud storage is configured to provide conventional storage system status messages to the host.

17. A method, according to claim 11, wherein the cloud storage is configured to exchange conventional storage system data with the host.

18. A method, according to claim 17, wherein the data is CKD format data.

19. A method, according to claim 11, wherein the TCP/IP network is the Internet.

\* \* \* \* \*